United States Patent [19]
Rogic et al.

[11] 3,928,445
[45] Dec. 23, 1975

[54] SYNTHESIS OF 2-HALO-5-CYANO ALKYL VALERATE

[75] Inventors: Milorad M. Rogic; Frantisek Mares, both of Whippany, N.J.

[73] Assignee: Allied Chemical Corporation, New York, N.Y.

[22] Filed: Dec. 26, 1973

[21] Appl. No.: 428,607

[52] U.S. Cl........ 260/566 A; 260/465.4; 260/534 L
[51] Int. Cl.² ..................................... C07C 131/04
[58] Field of Search............................... 260/566 A

[56] References Cited
UNITED STATES PATENTS
3,517,047   6/1970   Ohno et al. .................. 260/566 A
3,758,581   9/1973   Fuhrmann et al. ............. 260/566 A OTHER PUBLICATIONS
Morrison et al., "Organic Chemistry," pp. 132–133 and 391–392, (1962).

Primary Examiner—Gerald A. Schwartz
Attorney, Agent, or Firm—Arthur J. Plantamura; Ellen T. Dec

[57]         ABSTRACT

2-Halo-5-cyano alkyl valerate is produced by halogenating a 2-alkoxy-3-oximinocyclohexene or the mineral acid salt thereof with at least one equivalent of chlorine, bromine or iodine; treating the 1,2-dihalo-2-alkoxy-3-oximinocyclohexane intermediate thus formed with an alcohol having 1 to 12 carbon atoms, more preferably with ethanol, methanol, propanol, butanol or isobutanol to form the corresponding 2-halo-6-oximinocyclohexanone dialkyl ketal or its mineral acid salt; and ring opening of the ketal using a Beckmann cleavage reaction to form 2-halo-5-cyano alkyl valerate. The novel compound thus formed may be converted by reductive amination to form an alkyl ester of lysine which is subsequently hydrolyzed and neutralized to produce lysine.

4 Claims, No Drawings

SYNTHESIS OF 2-HALO-5-CYANO ALKYL VALERATE

BACKGROUND OF THE INVENTION

L-lysine 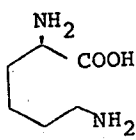

is one of the essential amino acids required in the metabolism of all animals. Since many animal bodies are incapable of producing this required nutritive factor, it must be supplied from an external source, such as by the animal and vegetable proteins of a normal diet.

Due to the cost and restricted availability of these natural animal and vegetable sources of proteins, synthetic methods for the production of lysine are being investigated. Synthetic lysine could be used as a supplement in animal diets, particularly in the diets of poultry and swine.

There is thus a need for an inexpensive, facile and efficient route to the production of synthetic lysine.

SUMMARY OF THE INVENTION

It has now been found in accordance with the present invention that lysine can be readily produced by the following synthetic method:

a. halogenating a 2-alkoxy-3-oximinocyclohexene or the mineral acid salt thereof with at least one equivalent of chlorine, bromine or iodine;

b. treating the 1, 2-dihalo-2-alkoxy-3-oximinocyclohexane intermediate thus formed with an alcohol having 1 to 12 carbon atoms, more preferably with ethanol, methanol, propanol, butanol or isobutanol to form the corresponding 2-halo-6-oximinocyclohexanone dialkyl ketal or its mineral acid salt;

c. ring opening of the ketal using a Beckmann cleavage reaction to form a 2-halo-5-cyano alkyl valerate;

d. converting the 2-halo-5-cyano alkyl valerate to form an alkyl ester of lysine by reductive amination;

e. hydrolyzing the lysine alkyl ester to form lysine dihydrochloride, and f. neutralizing the lysine dihydrochloride to form lysine hydrochloride.

This synthesis can be schematically represented as follows wherein X is chlorine, bromine or iodine and R is an alkyl group having 1 to 12 carbon atoms:

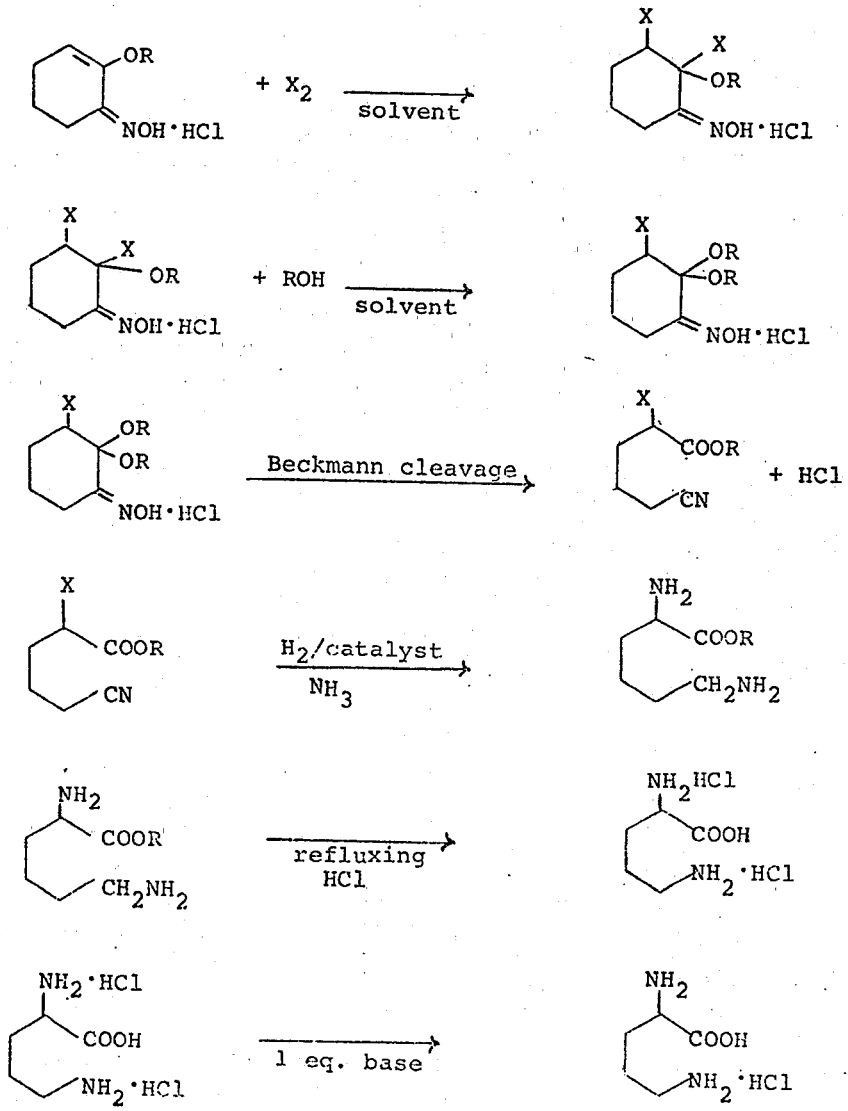

Moreover, since 2-alkoxy-3-oximinocyclohexene can be formed from cyclohexanone in situ, this novel lysine synthesis may be carried out in two steps involving conversion of the cyclohexanone to the 2-halo-5-cyano alkyl valerate followed by reductive amination and hydrolysis to produce the lysine hydrochloride.

As an alternate route to the production of lysine, the 1,2-dihalo-2-alkoxy-3-oximinocyclohexane intermediate may be reacted with ammonia in the presence of water to give the novel compound, 2-halo-6-oximinocyclohexanone, which exists in equilibrium with its enol form:

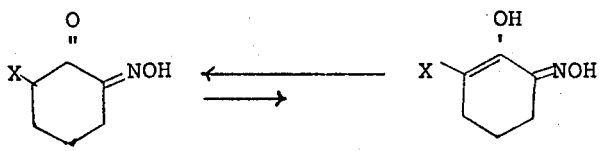

which can be further reacted to produce the 2-halo-5-cyano-alkyl valerate which is thereafter converted as previously described to lysine.

DESCRIPTION OF THE PREFERRED EMBODIMENTS

In accordance with the present invention, 2-alkoxy-3-oximinocyclohexene is halogenated to produce the 1,2-dihalo-2-alkoxy-3-oximinocyclohexane intermediate.

The 2-alkoxy-3-oximinocyclohexane or mineral acid salts used as starting materials will generally contain 1 to 12 carbon atoms in the alkoxy substituents and are disclosed in copending application Ser. No. 372,456, filed June 2, 1973. The material may be used as such in the synthesis of lysine or may be prepared in situ from cyclohexanone. The preparation in situ involves the nitrosation of the cyclohexanone in the presence of an inert solvent having a dielectric constant of at least about 12, and alcohol and at least one equivalent or hydrochloric acid. The 2-alkoxy-3-oximinocyclohexene hydrochloride thus formed may be used directly without isolation in the subsequent synthesis.

If the 2-alkoxy-3-oximinocyclohexene is used as starting material in the form of a free base, it is preferably reacted with one equivalent of hydrochloric acid before addition of the halogenating agent in order to prevent attack by the halogen on the oximino group. The 2-alkoxy-3-oximinocyclohexene hydrochloride is then halogenated with about 1 equivalent chlorine, bromine or iodine. Amounts of halogen in excess of about 1 mole may be used but no substantial benefit is known to ensue.

This halogenation is most suitably carried out in an inert solvent for both the 2-alkoxy-3-oximinocyclohexene and the halogen so as to provide good contact between the 2-alkoxy-3-oximinocyclohexene and the halogenating agent and to facilitate temperature control. Suitable solvents include sulfur dioxide, halogenated $C_1$–$C_4$ alkanes and alkane mono- and diethers having 4–8 carbon atoms. The term halogenated alkane connotes n- or isoalkanes that have at least one-third of the hydrogens thereof replaced by fluorine, chlorine or bromine, preferably fluorine or chlorine. Suitable examples of such halogenated alkanes include $CCl_3$, tetrachloroethane, dichloroethane, $CH_2Cl_2$, $CHCl_3$, tetrachloroethylene, bromoform, perfluorobutane, and the various fluorochlorohydrocarbons sold commercially under the trademarks "Genetron" or "Freon". Suitable alkane ethers include diethyl ether, glyme, diglyme, diethyl carbitol, and the like. The solvent is preferably substantially or completely water free. We have found that $SO_2$ is a preferred solvent for this reaction, particularly if the 2-alkoxy-3-oximinocyclohexene has been prepared in situ using $SO_2$ as solvent.

Although the halogenation can be carried out at virtually any temperature between the freezing and boiling points of the selected solvent, preferred reaction temperatures are between about −75°C. and ambient temperatures of up to about 25°C. When $SO_2$ is used as solvent, the reaction may be conveniently carried out at about −20°C. The halogenation is ordinarily carried out by dissolving the 2-alkoxy-3-oximinocyclohexene in the solvent at the desired reaction temperature and then gradually adding the halogenating agent. The reaction is usually complete within 30 minutes to one hour after addition of the halogen. Although the reaction is not strongly endothermic or exothermic, it is desirable to maintain the reaction mixture within the desired temperature range throughout the course of the reaction. Since the reaction is not pressure sensitive, it can be carried out at ambient or superatmospheric pressure.

The resulting solution containing the novel 1,2-dihalo-2-alkoxy-3-oximinocyclohexane intermediate is utilized directly in the next step of the synthesis without isolation.

In accordance with the lysine synthesis of the present invention, the resulting 1,2-dihalo-2-alkoxy-3-oximinocyclohexane intermediate is reacted with at least one equivalent of alcohol in an inert solvent to form the corresponding novel 2-halo-6-oximinocyclohexanone dialkyl ketal of the formula

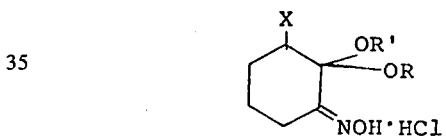

wherein X is chlorine, bromine or iodine, R is the alkyl group of the 2-alkoxy-3-oximinocyclohexene and R' is the alkyl group of the alcohol. We have found that exceptionally high yields of the desired ketal are obtained if the solution containing the 1,2-dihalo-2-alkoxy-3-oximinocyclohexane intermediate is refluxed for a period of about 1 to 1-½ hours prior to addition of the alcohol. Suitable alcohols used in the reaction may contain 1 to 12 carbon atoms and most preferably include methanol, ethanol, propanol, butanol and isobutanol. Amounts of alcohol in excess of one mole may be used but no advantage ensues therefrom. Any suitable inert solvent may be used; however, for simplicity in carrying out a continuous operation, it is preferred to use $SO_2$ as the solvent throughout the entire lysine synthesis. The production of the ketal is normally carried out by establishing in the solution containing the dihalo intermediate a temperature of about −10 to about −40°C. and adding the alcohol. This cooling is preferred since the reaction is exothermic and it is easier to maintain the temperature and control the reaction if at least one of the reactants is previously substantially cooled. The reaction is not pressure sensitive so it may be carried out under ambient or superatmospheric pressures. The reaction is usually complete within a period of 30 minutes to one hour.

While the halogenation of the 2-alkoxy-3-oximinocyclohexene can be carried out in the presence of an alcohol to produce the same ketal product, higher yields are obtained by carrying out the conversion in separate steps without isolating the 1,2-dihalo-2-alkoxy-3-oximinocyclohexane intermediate.

The lysine synthesis may be continued without isolation of the ketal product; however, if it is desired, the ketal may be isolated by evaporating the solvent, removing excess alcohol and neutralizing with base to give the free oximino ketal.

The 2-halo-6-oximinocyclohexanone dialkyl ketal is ring opened through the Beckmann cleavage reaction to form the novel 2-halo-5-cyano alkyl valerate compounds of the formula:

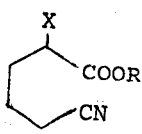

wherein X is chlorine, bromine or iodine and R is an alkyl group if R and R' of the dialkyl ketal are the same group; if R and R' are different alkyl groups, the R group of the valerate compound will be a mixture of the alkyl groups. This reaction occurs under usual conditions for the Beckmann cleavage reaction such as those disclosed by A. Werner and A. Piguet in Chem. Ber., 37, 4295 (1904); by A. Werner and Th. Detschiff in Chem. Ber., 38, 69 (1905); by A. Hassner and I. H. Pomerantz in J. Org. Chem. 27, 1760 (1962); and by Aa. Hassner, W. A. Wentworth and I. H. Pomerantz in J. Org. Chem. 28, 304 (1963). We have found that the conventional reagents disclosed in these references such as $SOCl_2$, $PCl_5$, TSCl/ROH, etc., may be used in the same solvent as has previously been used in the synthesis, preferably $SO_2$. If desired, the valerate may be isolated by evaporating the solvent and neutralizing any acid which may remain in the system.

In accordance with our novel lysine synthesis, the thus produced 2-halo-5-cyano alkyl valerate may be converted by reductive amination into an alkyl ester of lysine having the general formula:

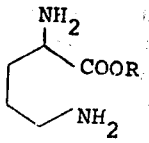

This reaction may be effected by substituting the halogen with ammonia to form the 2-amino-5-cyano alkyl valerate which is then subjected to catalytic hydrogenation. The hydrogenation is preferably carried out in the presence of a catalyst which will effect hydrogenation of the C≡N group to $CH_2NH_2$ without concomitant reduction of the ester group. We have found Raney nickel to be the most effective and selective catalyst in this regard, although other catalysts known in the art are effective in varying degrees. Hydrogen pressures and temperatures are not critical, pressures of 100 to 10,000 psig and temperatures of 25°C. to 300°C. being most suitable. Higher or lower pressures and temperatures may be employed but do not increase the yield of alkyl ester product, which generally is substantially quantitative. To facilitate the contacting of the valerate intermediate with the catalyst, the valerate is preferably dissolved in liquid ammonia or in a solvent system comprising ammonia and an inert cosolvent, such as a 1 to 3 carbon alkanol, a 4 to 8 carbon mono- or diether such as diethyl ether, glyme, diglyme, or diethylcarbitol; benzene; an alkyl aromatic solvent, such as toluene. It is to be noted that when ammonia is used in the solvent system during the hydrogenation, it will also act to aminate so that the conversion of the 2-halo-5-cyano alkyl valerate to the lysine ester may effectively be carried out in one step using aqueous ammonia in the presence of a hydrogenation catalyst. After reduction is complete which can be readily ascertained by noting the cessation of hydrogen uptake, the catalyst is separated as by filtration and the solution is then evaporated, affording the essentially pure ester as a residue.

If the ester is the ethyl ester, it may be resolved to obtain the nutrionally active L-enatiomer or it may be used directly as a dietary supplement with or without further purification, e.g., by recrystallization. A suitable recrystallization solvent is a $C_1$–$C_4$ alkanol. If an ester other than the ethyl ester is present, hydrolysis to lysine by refluxing the ester in aqueous hydrochloric acid followed by neutralization with one equivalent of base and cooling results in pricipitation of the lysine monohydrochloride, which may then be recovered by filtration. The hydrochloride is now ready for use as a food supplement or for resolution by known methods into the nutritionally active L-isomer.

As an alternate route to the production of lysine, the 1, 2-dihalo-2-alkoxy-3-oximinocyclohexane intermediate may be hydrolyzed in the presence of aqueous ammonia and a suitable solvent to produce novel 2-halo-6-oximinocyclohexanone which exists in equilibrium with its enol form:

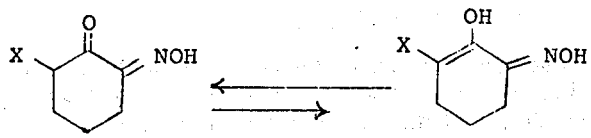

This compound may be subsequently converted to the 2-halo-5-cyano valerate and ultimately to lysine.

The invention can be more fully understood by reference to the following examples. All parts are parts by weight unless otherwise expressly noted.

While these examples illustrate batch preparation of lysine from cyclohexanone, it is readily apparent that this synthesis may be adapted to the continuous production of lysine.

EXAMPLE 1

SYNTHESIS OF 2-CHLORO-6-OXIMINOCYCLOHEXANONE DIMETHYL KETAL

A mixture of 42.1 g. (0.237 mole) 2-methoxy-3-oximinocyclohexene hydrochloride in 150 ml $SO_2$ was cooled to −60°C. and 17.05 g. (0.24 mole) $Cl_2$ were gradually added. The reaction occurred immediately as the temperature of the mixture rose to −40°C. After completion of the addition of $Cl_2$, the reaction mixture was slowly warmed to −20° and refluxed for 1-½ hours, after which time it was cooled to −40° and 25 ml of MeOH were added and allowed to react. The reaction was completed in about 30 minutes and the $SO_2$ and excess HCl were evaporated at a temperature lower than 0°C. To isolate the product, an additional 100 ml. MeOH were added and the mixture neutralized with $Na_2CO_3$. The mixture was filtered to remove the salts and the methanol was evaporated at room temperature to produce 38 g. crystalline 2-chloro-6-oximinocyclohexanone dimethyl ketal.

EXAMPLE 2

Preparation of 2-Chloro-5-Cyano Methyl Valerate

Eight grams (0.041 mole) 2-chloro-6-oximinocyclohexanone dimethyl ketal were combined with 60 ml of glyme and mixed at 0° with 16 g. (0.134 mole) $SOCl_2$ in 20 ml of ether. The mixture was warmed to 20°C. under $N_2$ over a period of 1 hour until the oxime crystals disappeared. For the purposes of yield determination, the solvents and excess $SOCl_2$ were then evaporated in vacuum. The residue was diluted with chloroform and extracted with $NaHCO_3$ and water. The chloroform layer was dried and chloroform was stripped off in vacuo. The residue was distilled giving 6.56 g. of the 2-chloro-5-cyano methyl valerate.

EXAMPLE 3

Synthesis of 2-Chloro-6-Oximinocyclohexanone

The procedure of Example 1 was repeated using 0.29 mole of each of 2-methoxy-3-oximinocyclohexanone hydrochloride, $Cl_2$ and MeOH to produce the dichloro intermediate. After evaporation of $SO_2$, the residue was dissolved in chloroform, cooled to about −20° and the reaction mixture was neutralized with aqueous ammonia. The solvents were evaporated and the chloroform layer was washed with water, dried over $MgSO_4$ and evaporated to give 39.2 g. (0.27 mole) of a liquid consisting primarily of 2-chloro-6-oximinocyclohexanone.

EXAMPLE 4

Synthesis of Lysine

Into a mixture of 6 g. MeOH and 150 ml $SO_2$, 8.5 g HCl were absorbed while maintaining the temperature at −60°C., followed by condensation of 15.5 g. NOCl into the reaction flask. In a separate operation, 23.5 g. cyclohexanone and 4 g. methanol were combined and then added dropwise to the reaction mixture. During the addition of cyclohexanone (about 20 minutes) the temperature increased from −60° to −30°C. and it was maintained at −30° for another 30 minutes until the red color of the NOCl disappeared. The mixture was then cooled to −60° and 16.6 g. $Cl_2$ were added. The chlorine was consumed as it came into contact with the reaction mixture and the temperature increased to −40°C. After completion of the addition of $Cl_2$, the reaction mixture was slowly warmed to reflux $SO_2$ for a period of about 1-½ hours. The mixture was then cooled to about −40° and then about 25 ml methanol added and allowed to react. After about 30 minutes, 73.8 g. $SOCl_2$ were added. The reaction mixture was refluxed under $N_2$ for a period of about 2 hours. The $SO_2$ and excess HCl and $SOCl_2$ were evaporated in vacuum, the residue diluted with chloroform and extracted with $NaHCO_3$ and water. The chloroform layer was dried and chloroform was stripped off in vacuo. The residue was distilled giving about 31.5 g. 2-chloro-5-cyano methyl valerate. The 31.5 g. 2-chloro-5-cyano methyl valerate was dissolved in about 1 l of a 1:1 mixture of methanol and ammonia containing 1 g. Raney nickel. The mixture was hydrogenated at 60°C. and 50–70 psig hydrogen pressure in a Parr bomb. The uptake of hydrogen was 97% of theoretical in 4–6 hours. The mixture was filtered, evaporated to dryness on a rotary evaporator, and the residue refluxed with 50 ml. 6N HCl for 3 hours. The resulting solution was concentrated on a rotary evapaorator to a thick syrup, which was dissolved in 10 ml. 95% EtOH at reflux. The solution was treated with 0.5 ml. pyridine in 1 ml. 95% ethanol, cooled slowly, and left standing for 25 hr. at room temperature followed by 16 hours in the refrigerator. The lysine hydrochloride which precipitated was collected by suction filtration, washed with ethanol, and dried in air at 120°C.

A total of 25.2 g. was obtained. Analysis of the mother liquors indicated the presence of an additional 3.1 g. of lysine hydrochloride, for a total yield of 28.3 g.

We claim:

1. A compound of the formula:

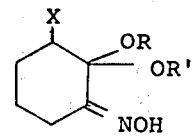

wherein X is a member of the group consisting of chlorine, bromine and iodine and R and R′ are independent alkyl groups having 1 to 12 carbon atoms.

2. The compound of claim 1 in the form of a mineral acid salt.

3. The compound of claim 1 wherein X is chlorine.

4. The compound, 2-chloro-6-oximinocyclohexanone dimethyl ketal.

* * * * *